July 22, 1952  W. E. CRAMER  2,604,226
CONTAINER AND CLOSURE THEREFOR
Filed Aug. 16, 1948
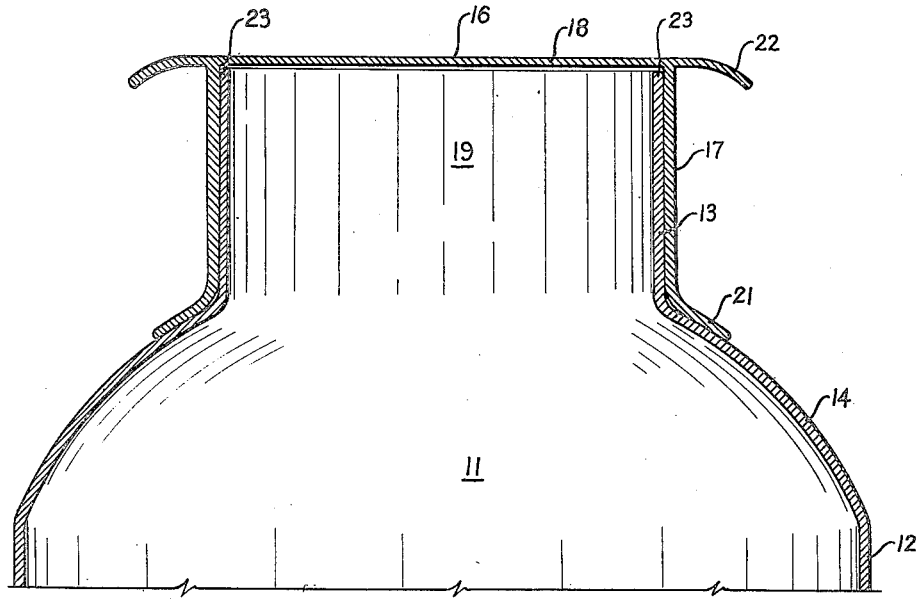
FIG.—2
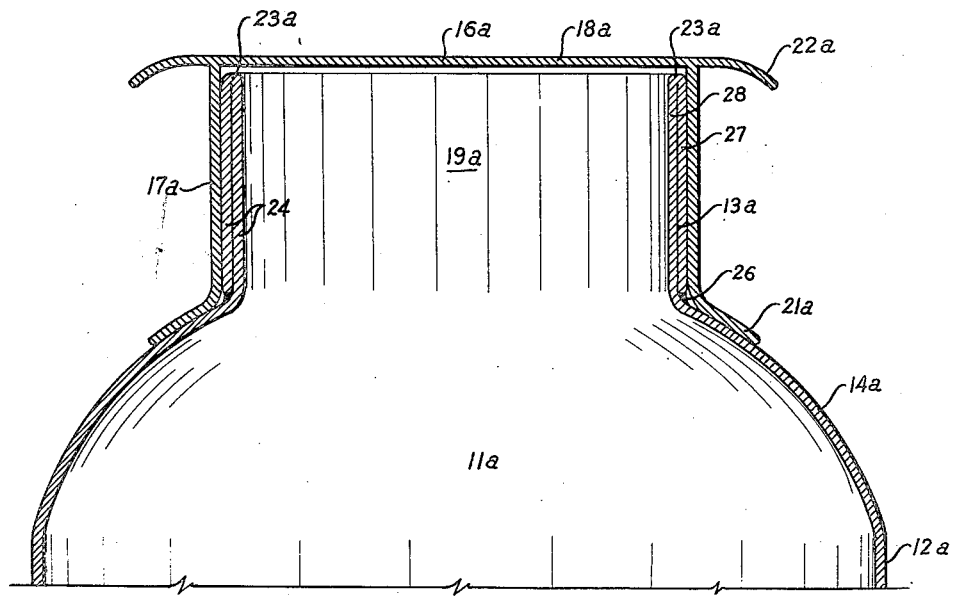
FIG.—1
INVENTOR.
Wilson E. Cramer
BY
ATTORNEY Patented July 22, 1952

2,604,226

UNITED STATES PATENT OFFICE 2,604,226

CONTAINER AND CLOSURE THEREFOR

Wilson E. Cramer, Sparta, Wis.

Application August 16, 1948, Serial No. 44,540

1 Claim. (Cl. 220—42)

This invention relates to a container for liquids and more particularly to a milk can.

Formerly containers used in the transport of milk have been of a conventional design wherein a cap is adapted to fit inside a neck portion of the container. The cap, under former practice, has been retained in position by a forced or pressed fit. Inasmuch as the cap was received inside of the neck portion and inasmuch as it was engaged in a forced fit, there was a tendency of the metal plate formed on the surfaces of such containers to wear away. When the metal plate has worn away under the effects of such contact, the containers become unserviceable inasmuch as the liquid content is then exposed to bare metal. Likewise the prior form of caps for milk containers have allowed the entrance of dirt, foreign material and insects into the container when the lid is removed. Such foreign materials gather under the lip of the lid and as the lid is removed, they fall directly into the liquid.

It is an object of this invention to provide a container for liquids having a lid that may be tightly sealed without binding.

It is a further object of this invention to provide a container having a galvanized or otherwise plated surface that will remain serviceable for a long period of time.

Another object of this invention is to provide a container having galvanized or otherwise plated surfaces that are free from wearing contact on all liquid contacting surfaces.

A still further object of this invention is to provide a novel milk container and a lid therefor that may be washed with existent automatic washing equipment.

Another object of this invention is to provide a milk container and a lid therefor that will prevent the entrance of dirt and other foreign material.

Further objects and advantages of this invention will be apparent from the appended description and drawings in which:

Fig. 1 is a cross sectional elevation of an embodiment of this invention showing a double strength neck section.

Fig. 2 is likewise a cross sectional elevation of a separate embodiment of this invention.

Briefly stated this invention provides a new and useful liquid container that will remain serviceable for a long period of time. Among the novel features of this container is a lid member arranged to fit over a neck portion of the container. The lid member is formed to have a top closure member and cylindrical sides having a flared extremity. The cylindrical portion of the lid is arranged for a close fit with the exterior walls of the neck portion, thereby preventing leakage, and the flared extremity is arranged for engagement with a shoulder on the milk can preventing entrance of dirt.

The length of the cylindrical portion of the lid is such that when the flared section is in engagement with the shoulder the top of the lid is not in contact with the upper extremity of the neck of the container. This novel arrangement prevents any contact between the lid and the container along any surfaces which liquid will contact or over which liquid will be poured. Inasmuch as there is no contact along these surfaces the metal plating used will be preserved, the liquid will not be contaminated, and the container will be usable for a longer period of time.

Referring now to the drawings, Fig. 2 shows a separate embodiment of this invention in which a container 11 having a large cylindrical section or body portion 12 and a smaller cylindrically formed neck section 13 has a shoulder 14 interconnecting sections 12 and 13. While sections 12 and 13 and shoulder 14 are shown as formed from one piece of material as by extrusion, rolling, or spinning it will be apparent that other means of construction may be used. A lid member 16 having cylindrical sides 17 and a top closure section 18 is arranged to close the opening 19 formed at the upper extremity of neck section 13. The cylindrical sides 17 of lid member 16 have a flared extremity 21, and top closure section 18 has a flange portion 22 extending beyond cylindrical sides 17 to provide a gripping means for removal of the lid. Cylindrical sides 17 are longer than the length of neck section 13 so that flared extremity 21 will engage shoulder 14 when lid member 16 is placed over neck section 13. Inasmuch as flared extremity 21 engages shoulder 14, and inasmuch as cylindrical sides 17 are longer than neck section 13, the top closure section 18 will not be in engagement with a pouring lip 23 formed on the upper extremity of neck section 13.

In a preferred embodiment of this invention as shown in Fig. 1, a container 11a having a cylindrical section or body portion 12a joined to a neck section 13a by a shoulder 14a provides an opening 19a for the reception of liquids. Neck section 13a provides a double thickness of material 24, the outer thickness 27 being an extension of the inner thickness 28 doubled back upon the outer surface of the inner thickness 28. Such double thickness is provided by rolling or spinning the material back upon itself, and the length of section 13a is such that the double thickness of material 24 uses no more material than is now used in conventional milk cans. For purposes of added strength a welded fillet 26 joins the outer thickness 27 to the inner thickness 28 at the base of neck section 13a.

A lid member 16a being of the same dimensions as conventional milk covers now in use and having cylindrical sides 17a and a top closure section 18a is provided to seal opening 19a in the following manner. Cylindrical sides 17a have a flared extremity 21a, and top closure section 18a has a flange portion 22a extended beyond cylindrical sides 17a. Cylindrical sides 17a are longer than neck section 13a. When lid member 16a is engaged with neck section 13a cylindrical sides 17a engage the outer surface of outer thickness 27 of neck section 13a. Flared extremity 21a engages shoulder 14a and inasmuch as cylindrical sides 17a are longer than neck section 13a top closure section 18a is prevented from touching a pouring lip 23a formed at the upper extremity of neck section 13a. Flange portion 22a provides a gripping means for removing lid member 16a from container 11a.

In use, containers 11 are filled with any desirable liquid and lid members 16 are placed on the containers 11. Lid members 16 are in liquid tight engagement with neck sections 13 to prevent the escape of any liquids. Flared extremities 21 engage shoulders 14 to prevent the entrance of any foreign materials into container 11. Inasmuch as lid members 16 engage only the outer surfaces of neck sections 13 any metal plate formed on the surfaces of containers 11 that might be removed by a close fit will be on outer surfaces of neck sections 13 or on shoulder 14. The inner surfaces of container 11 inclusive of a pouring lip 23 on the upper extremity of neck sections 13 will not be in metal-to-metal contact and consequently the metal plate on these liquid contacting surfaces will be preserved.

While separate preferred embodiments of this invention have been shown and described it will be apparent that the invention is applicable to certain obvious modifications. For instance, the present invention is adaptable to notch and pin types of fastening devices. Such obvious modifications are considered to be within the scope of this invention and it is not intended to limit this invention to the embodiments shown and described. The essential limitations are included in the appended claim.

What is claimed is:

In a sanitary milk can having a body portion provided with a bottom and upright cylindrical walls, a neck portion also having upright uninterrupted smooth cylindrical walls and of smaller diameter than said body portion, an inclined shoulder portion interconnecting the upright cylindrical walls of the body and neck portions, and a removable lid member having depending uninterrupted smooth cylindrical walls telescopically engaging the upright cylindrical walls of the neck portion and having a peripherally flanged top, the improvement which comprises forming the walls of the neck portion of the milk can of two thicknesses of material with the outer thickness thereof being an extension of the inner thickness doubled back upon the outer surface of said inner thickness substantially throughout the height of the neck portion with its lower free end terminating in close proximity to the shoulder portion, forming the lid member from relatively rigid smooth surfaced material, the uninterrupted depending cylindrical walls of said lid member being of substantially greater height than the height of the double walls of the neck portion of the can and having an annular outwardly and downwardly flared bottom portion having substantially the same inclination as the inclined shoulder portion and engaging the inclined shoulder portion of the can in face contacting relation when the lid is in place thereon whereby to maintain the inner surface of the flanged top of the lid member spaced from and out of contact with the upper edge of the cylindrical double walls of the neck portion.

WILSON E. CRAMER.

REFERENCES CITED

The following references are of record in the file of this patent:

UNITED STATES PATENTS

| Number | Name | Date |
|---|---|---|
| 641,391 | Hutchinson | Jan. 16, 1900 |
| 672,692 | Bailey | Apr. 23, 1901 |
| 1,242,876 | Watson | Oct. 9, 1917 |
| 1,335,259 | Roy | Mar. 30, 1920 |
| 1,417,932 | Mann | May 30, 1922 |
| 1,486,374 | Gesell | Mar. 11, 1924 |

FOREIGN PATENTS

| Number | Country | Date |
|---|---|---|
| 486,961 | France | Feb. 28, 1918 |